(12) United States Patent
Scharifker et al.

(10) Patent No.: US 7,498,007 B2
(45) Date of Patent: Mar. 3, 2009

(54) PROCESS TO RECOVER VANADIUM CONTAINED IN ACID SOLUTIONS

(76) Inventors: Benjamin Scharifker, Monteclaro Laguna 45-6, Carretera Nacional, Sector El Laurel, Baruta Caracas (VE); Rossana Arenare, Calle Paez, Conjunto Residencial La Trinidad, Edif. La Guairita C Ap. 8-1, La Trinidad, Baruta Caracas (VE)

(*) Notice: Subject to any disclaimer, the term of this patent is extended or adjusted under 35 U.S.C. 154(b) by 737 days.

(21) Appl. No.: 11/081,150

(22) Filed: Mar. 16, 2005

(65) Prior Publication Data
US 2005/0249652 A1 Nov. 10, 2005

Related U.S. Application Data

(62) Division of application No. 10/198,062, filed on Jul. 18, 2002, now abandoned.

(51) Int. Cl.
*C01G 31/00* (2006.01)
(52) U.S. Cl. ............... 423/65; 423/66; 423/68; 423/166; 423/531
(58) Field of Classification Search ............... 423/65, 423/66, 68, 166, 531
See application file for complete search history.

(56) References Cited

U.S. PATENT DOCUMENTS

| | | | |
|---|---|---|---|
| 1,430,864 A | | 10/1922 | Thews |
| 1,747,403 A | | 2/1930 | Tilley |
| 2,193,092 A | * | 3/1940 | Frederick et al. ............... 423/66 |
| 2,211,119 A | * | 8/1940 | Hixson et al. .................. 423/63 |
| 2,257,978 A | * | 10/1941 | Robertson et al. ............. 423/67 |
| 2,357,488 A | * | 9/1944 | Nelson .......................... 423/67 |
| 2,407,008 A | * | 9/1946 | Hixson et al. ............... 205/489 |
| 2,822,240 A | * | 2/1958 | Dunn et al. .................... 423/68 |
| 4,061,711 A | | 12/1977 | Morgan et al. |
| 4,126,663 A | * | 11/1978 | Pitts ............................. 423/63 |
| 4,243,639 A | | 1/1981 | Haas et al. |
| 4,389,378 A | | 6/1983 | McCorriston |
| 4,436,706 A | | 3/1984 | Nacken et al. |
| 4,443,415 A | | 4/1984 | Queneau et al. |
| 4,451,339 A | | 5/1984 | Kranz et al. |
| 4,472,360 A | | 9/1984 | McCorriston |
| 4,477,416 A | | 10/1984 | Goddard |
| 4,521,382 A | | 6/1985 | Kessick et al. |
| 4,524,049 A | | 6/1985 | Sit |
| 4,536,374 A | | 8/1985 | McCorriston |
| 4,539,186 A | | 9/1985 | Schemel et al. |
| 4,548,792 A | | 10/1985 | Rodriguez et al. |
| 4,579,721 A | * | 4/1986 | Friedman ..................... 423/66 |
| 4,788,044 A | | 11/1988 | Corigliano et al. |
| 4,816,236 A | | 3/1989 | Gardner |
| 4,849,189 A | | 7/1989 | Jansz |
| 4,978,511 A | | 12/1990 | Young |
| 5,250,158 A | | 10/1993 | Kaneko et al. |
| 5,277,795 A | | 1/1994 | Thornhill et al. |
| 5,876,581 A | | 3/1999 | Itaya et al. |
| 2003/0029728 A1 | | 2/2003 | Scharifker et al. |
| 2003/0165413 A1 | | 9/2003 | Scharifker et al. |

FOREIGN PATENT DOCUMENTS

| AU | 641593 | 9/1993 |
|---|---|---|
| JP | 52-30775 | 3/1977 |

OTHER PUBLICATIONS

"A biaxial nematic gel phase in aqueous vanadium pentoxide suspensions," The European Physical Journal B, O.Pelletier et al., 12, (1999), Societa Italiana di Fisica, pp. 541-546.

"Redox Chemistry of $H_2S$ oxidation by the British Gas Stretford Process, Part IV: V-S-H20 Thermodynamics and aqueous vanadium (v) reduction in alkaline solutions," Journal of Applied Electrochemistry, G.H. Keslsall et al., 23, (1993), Chapman & Hall, pp. 417-426.

"Microporous Vanadium Pentaoxide. 2. Making Solids from Colloidal Microemulsions," Langmuir, Desai et al., 14, (1998), American Chemical Society, pp. 277-282.

"Electro-Reductive stripping of vanadium in solvent extraction process for separation of vanadium and molybdenum," Journal of Chemical Engineering of Japan, Hirai et al., 24 No. 1, (1991), pp. 124-125.

"Reactivite Electrochimique de Quelques Oxydes de Vanadium en Milieu HC1 1 M," Electrochhimica Acta, Elouadseri et al., 31 No. 10, (1986), Pergamon Journal Ltd., pp. 1335-1339.

"Recovery of Vanadium and Nickel in Fly Ash from Heavy Oil," Journal of Chemical Technology & Biotechnology, 62, (1995), Akita et al., SCI, pp. 345-350.

(Continued)

*Primary Examiner*—Steven Bos
(74) *Attorney, Agent, or Firm*—Brinks Hofer Gilson & Lione

(57) ABSTRACT

A process for recovery of vanadium dissolved in acid solutions or liquors by precipitating it out as vanadium pentoxide. Separation is carried out by adding calcium hydroxide, quicklime or calcium carbonate to the acid solution or liquor, producing a precipitate of vanadium pentoxide, which is separated from the liquid by physical methods such as filtration or centrifugation. If the acid is other than sulfuric acid, the calcium which remains dissolved in the solution or liquor by the addition of calcium hydroxide, quicklime or calcium carbonate, is removed by adding sulfuric acid, to produce solid calcium sulfate and water. The calcium sulfate is extracted from the solution or liquor or liquor by filtration or centrifugation. With sulfuric acid solution or liquors, after addition of the neutralizing agent, a solid precipitate of vanadium pentoxide and calcium sulfate is formed, which is then separated from the solution or liquor. The solid vanadium pentoxide is dissolved by adding an acid other than sulfuric acid to the vanadium pentoxide and calcium sulfate precipitate and the solid calcium sulfate is separated from the resultant solution or liquor. Solid sodium hydroxide is added to the resultant solution or liquor and vanadium pentoxide is precipitated.

16 Claims, No Drawings

OTHER PUBLICATIONS

"Electrochemically synthesized vanadium oxides as Lithium insertion hosts," Electrochimica Acta, E Potiron et al., 45 (1999), Elsevier Science Ltd., pp. 197-214.

"Catalytic determination of Ultra trace amounts of vanadium with detection by linear sweep voltammetry," Journal of Analytical Chemistry, Ensalfi et al., 358 (1997), Springer Verlag, pp. 480-483.

"Electrochemical behaviour of Vanadium compounds at a carbon paste electrode," Journal of Electroanalytical Chemistry, E. Barrado et al., 427 (1997), Elsevier Science S.A. pp. 35-42.

"Vanadium Recycling", Fusion Technology, T.J. Dolan et al., 26 (1994), pp. 1014-1019.

"Electrochemical quartz crystal microbalance study for vanadium hexacyanoferrates: Monitoring of film growth and ion effects during redox reactions," Journal of Electroanalytical Chemistry, Wang et al., 430 (1997), Elsevier Science, S.A, pp. 127-132.

"Synthesis and Properties of Two Series of Heavy Metal Hexacyanoferrates," Journal of Inorganic Nuclear Chemistry, 33 (1971), Ayers et al., Pergamon Press, pp. 721-733.

"Synthesis and Properties of a Series of Pentacyanoferrates" Journal of Inorganic Nuclear Chemistry, 31, (1969), Ayers et al., Pergamon Press, pp. 2045-2051.

"Researches on Chemically Modified Electrodes, Part XVI Electron Diffusion Coefficient in Vanadium Hexacyanoferrate film" Journal Electroanalytical Chemistry, 217 (1987), Shaojun et al., Elsevier Sequoia, S.A., pp. 49-63.

"Developments of biosensors based on Hexacyanoferrates," Talanta. 52 (2000), Luiz de Mattos et al., Elsevier Science B.V., pp. 791-799.

* cited by examiner

PROCESS TO RECOVER VANADIUM CONTAINED IN ACID SOLUTIONS

RELATED APPLICATIONS

This is a divisional application of U.S. patent application Ser. No. 10/198,062 filed on Jul. 18, 2002 now abandoned, which application claims, under 35 U.S.C. § 119, the benefit of priority of Venezuelan patent application Serial Number VE 2001-1539, filed on Jul. 18, 2001, the entire contents of which are incorporated herein by reference.

The method relates to the recovery of vanadium dissolved in acid solutions by precipitating it directly as vanadium pentoxide. Recovery is carried out by addition of calcium hydroxide, quicklime or calcium carbonate to the acid solution or liquor, forming a precipitate of vanadium pentoxide, which is separated from the liquid by physical methods like filtration or centrifugation. If the acid is other than sulfuric acid, then the dissolved calcium that remains in the solution or liquor from addition of calcium hydroxide, quicklime or calcium carbonate, is removed by addition of sulfuric acid, yielding solid calcium sulfate and water. The calcium sulfate is extracted from the solution or liquor by filtration or centrifugation. The original composition of the acid solution is only modified by the lowering of its vanadium content, as well as by slight dilution due to formation of water, both from addition of calcium hydroxide, quicklime or calcium carbonate during the first step, as well as from addition of sulfuric acid during the second. cl BACKGROUND The present invention relates to the separation of vanadium from acid solutions containing it, such as, for example, typical liquors originated from the treatment of carbonaceous materials like fractions of heavy crude oil or residues obtained from oil refining processes (for example, petroleum coke). In these liquors, which also contain other metals like nickel, the typical dissolved vanadium contents usually exceed 4%.

The recovery of vanadium from these solutions is of interest because of its relatively high concentration, thus representing an interesting source of this metal, which has diverse industrial applications, such as in catalysts for oil refining processes, preparation of ferrous alloys (steel) and the construction of batteries.

The processes in the scientific literature for the recovery of vanadium comprise primarily precipitation with complexing agents like ammonia to form ammonium metavanadate. This procedure requires adjustment of the solution pH from its initial value, usually between zero and one, to a value close to two. The latter implies partial neutralization of the original acid content, meaning that the neutralized solution must be thrown away, which is not desirable.

According to the literature, the solid ammonium metavanadate is subsequently separated from the acid solution by physical means like filtration, centrifugation, etc., and then heated in air at temperatures between 600 and 650 degrees Celsius, in order to transform it into vanadium pentoxide, with evolution of ammonia.

The processes according to the present invention allow the recovery of vanadium from solution, whatever its oxidation state, by precipitating it directly as vanadium pentoxide.

With processes according to the present invention, less costly reagents are used as compared to those of conventional methods, and the precipitation of vanadium pentoxide occurs at lower pH values, close to one, which allows reusing the original acid solution, thus reducing costs associated with the procedure as well as production of waste materials.

After recovering the vanadium pentoxide and when the acid present in the liquor is different from sulfuric, the accumulation of calcium that forms from addition of calcium hydroxide, quicklime or calcium carbonate is eliminated by addition of sulfuric acid in the vanadium-deprived liquor. In this way, precipitation of calcium sulfate is achieved, which can be easily separated from the solution by means of simple physical methods (solid-liquid separation), including filtration, centrifugation, and decantation. Therefore a liquor is obtained, with a composition that is identical to the original, except for its vanadium content and the slight dilution from addition of calcium hydroxide, quicklime or calcium carbonate during the first step, as well as sulfuric acid during the second.

In the method described in the literature to precipitate ammonium metavanadate, a liquid-liquid separation is required to withdraw from the original liquor the excess ammonia used as precipitating agent. These kinds of separations are usually more complicated than the solid-liquid separations required here.

The calcium sulfate produced by the method according to the present invention has no harmful effects over the environment and can even be commercialized.

The percentage of vanadium recovered from the solution by the processes according to the present invention may be up to or greater than 98%.

DESCRIPTION OF THE INVENTION

First, if necessary, the vanadium dissolved in the acid solution or liquor is oxidized to vanadium (V) by passing air through the solution. In most cases the oxidation state of vanadium in these liquors is (V) and therefore this oxidation is not required.

The acid solution that contains vanadium can be concentrated or dilute, and may be composed of any inorganic acid, such as nitric, sulfuric, hydrochloric, phosphoric, hydrofluoric or mixtures thereof.

Calcium hydroxide, quicklime or calcium carbonate is added to the solution or liquor that contains the dissolved vanadium until the occurrence of a solid phase in the liquid. The quantity of calcium hydroxide, quicklime or calcium carbonate that is added depends on the concentration of vanadium and acid in the liquor.

Precipitation of the vanadium compound occurs as a result of the increase of pH. The pH value required for precipitation depends on the concentration of dissolved vanadium, according to the following equation:

$$VO_2^+ + H_2O \rightarrow V_2O_5 + 2H^+ \tag{1}$$

When the acid present in the liquor is other than sulfuric acid, the solid precipitated by addition of the neutralizing agent is vanadium pentoxide.

After vanadium has precipitated, the solid is separated from the liquid phase by means of filtration, decantation, or centrifugation of the precipitate-containing solution. If required, the vanadium pentoxide obtained may be purified and crystallized by heating in air at temperatures between 500 and 1400 degrees Celsius, preferably 500 degrees Celsius.

When sulfuric acid is not present in the solution, the calcium that remains in the solution after precipitation of the vanadium pentoxide is precipitated by adding sulfuric acid to the solution after the vanadium pentoxide precipitate has been separated therefrom.

A stoichiometric amount of sulfuric acid is added to the solution based on the amount of neutralizing agent added to the solution.

With this addition, calcium sulfate is produced, a white-colored solid, which is separated from the liquor by means of a physical method such as filtration, decantation, centrifugation, etc. A small amount of water is also produced.

The resulting liquid or filtrate (acid solution or liquor) resulting after separation of calcium sulfate preserves the initial composition, except for the concentration of dissolved vanadium, which decreases over 98%, and for a slight dilution related to the amount of neutralizing agent (calcium hydroxide, quicklime or calcium carbonate) and sulfuric acid that are added.

If sulfuric acid is present in the liquor, besides precipitation of vanadium pentoxide, calcium sulfate also precipitates; thus a mixture of calcium sulfate and vanadium pentoxide is obtained. The proportion of calcium sulfate and vanadium pentoxide in the solid mixture depends both on the concentration of vanadium as well as the concentration of sulfuric acid originally present in the liquor.

Various methods can be used to separate the solid calcium sulfate and vanadium pentoxide from the solution. Preferably, the vanadium pentoxide is dissolved with an acid other than sulfuric acid and the solid calcium sulfate is filtrated from the solution. The dissolved vanadium in the solution can then be precipitated as vanadium pentoxide in accordance with the processes described herein.

When the acid in the liquor is sulfuric, the solution resulting from neutralization (addition of calcium hydroxide, quicklime or calcium carbonate) after extracting the solids has an acid content below its original value, due to consumption of sulfate ions during calcium precipitation. Thus the concentration of sulfuric acid decreases.

EXAMPLE 1

Two hundred and fifty ml of an aqueous solution of 1% vanadium pentoxide and 20% nitric acid solution (initial pH of −0.3 units) were neutralized, adding slowly 37 g of calcium hydroxide while the change in pH was recorded. Once this amount of calcium hydroxide was added, the pH of the solution was 0.1 and precipitation of a brownish solid was observed.

This solid was filtered, dried and dehydrated by heating in a muffle to a temperature of 500 degrees Celsius. It was then weighed and characterized by its x-ray diffraction pattern as vanadium pentoxide.

To the resulting solution, after filtering the brownish solid, 28 ml of 97% sulfuric acid were added, and precipitation of a white solid was observed. This solid was then separated from the liquid, dried and characterized by its x-ray diffraction pattern as calcium sulfate. With this procedure more than 90% of the original vanadium in the solution was successfully precipitated.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

It is therefore intended that the foregoing detailed description be regarded as illustrative rather than limiting, and that it be understood that it is the following claims, including all equivalents, that are intended to define the spirit and scope of this invention.

The invention claimed is;

1. A method of recovering vanadium from solutions or liquors containing sulfuric acid comprising steps of:
   a. oxidizing the vanadium in the solution or liquor to vanadium (V);
   b. adding to the solution or liquor a neutralizing agent selected from the group consisting of calcium hydroxide, quicklime, calcium carbonate and combinations thereof to form a precipitate of calcium sulfate and vanadium pentoxide;
   c. separating the vanadium pentoxide and calcium sulfate precipitate from the solution or liquor;
   d. adding an acid other than sulfuric acid to the vanadium pentoxide and calcium sulfate precipitate to obtain solid calcium sulfate and dissolved vanadium pentoxide;
   e. separating the solid calcium sulfate from the resultant solution obtained from step d;
   f. adding sodium hydroxide to the resultant solution;
   g. precipitating the vanadium pentoxide from the resultant solution; and
   h. separating the precipitated vanadium pentoxide from the resultant solution.

2. The method of claim 1 where the vanadium in the solution or liquor is oxidized by passing air through the solution or liquor.

3. The method of claim 1 where the separating of step e is accomplished by filtration, centrifugation, or decantation.

4. The method of claim 1 where the separating of step h is accomplished by filtration, centrifugation, or decantation.

5. The method of claim 1 where the acid solution or liquor is derived from carbonaceous materials.

6. The method of claim 5 where the carbonaceous materials are crude oil, fractions of crude oil, residues from processing crude oil, residues from processing fractions of crude oil, cokes, mineral carbons, or bitumen sands.

7. The method of claim 1 where the acid solution or liquor is concentrated.

8. The method of claim 1 where the acid solution or liquor is dilute.

9. A method for recovering vanadium from sulfuric acid solutions containing oxidized vanadium comprising steps of:
   a. adding to the solution a neutralizing agent selected from calcium hydroxide, quicklime, calcium carbonate or combinations thereof;
   b. separating solid vanadium pentoxide and calcium sulfate precipitate from the solution;
   c. adding an acid other than sulfuric acid to the solid vanadium pentoxide and solid calcium sulfate precipitate to obtain solid calcium sulfate and dissolved vanadium pentoxide in solution;
   d. separating the solid calcium sulfate from the resultant solution obtained from step c;
   e. adding sodium hydroxide to the resultant solution;
   f. precipitating solid vanadium pentoxide from the resultant solution;
   g. separating the solid vanadium pentoxide from the resultant solution.

10. The method of claim 9 where the vanadium in the solution or liquor is oxidized by passing air through the solution or liquor.

11. The method of claim 9 where the separating of step e is accomplished by filtration, centrifugation, or decantation.

12. The method of claim 9 where the separating of step h is accomplished by filtration, centrifugation, or decantation.

13. The method of claim 9 where the solution or liquor is derived from carbonaceous materials.

14. The method of claim 13 where the carbonaceous materials are crude oil, fractions of crude oil, residues from processing crude oil, residues from processing fractions of crude oil, cokes, mineral carbons, or bitumen sands.

15. The method of claim 9 where the solution or liquor is concentrated.

16. The method of claim 9 where the solution or liquor is dilute.

\* \* \* \* \*

UNITED STATES PATENT AND TRADEMARK OFFICE
CERTIFICATE OF CORRECTION

PATENT NO.        : 7,498,007 B2
APPLICATION NO.   : 11/081150
DATED             : March 3, 2009
INVENTOR(S)       : Benjamin Scharifker et al.

It is certified that error appears in the above-identified patent and that said Letters Patent is hereby corrected as shown below:

On the Title Page

Item (76), after "Scharifker," delete "Monteclaro Laguna 45-6, Carretera Nacional, Sector El Laurel,"; and after "Arenare," delete "Calle Paez, Conjunto Residencial La Trinidad, Edif. La Guairita C Ap. 8-1, La Trinidad,".

Item (57), line 12, under "ABSTRACT", delete "or liquor" (second occurrence).

Signed and Sealed this

Eighth Day of December, 2009

David J. Kappos
*Director of the United States Patent and Trademark Office*